UNITED STATES PATENT OFFICE.

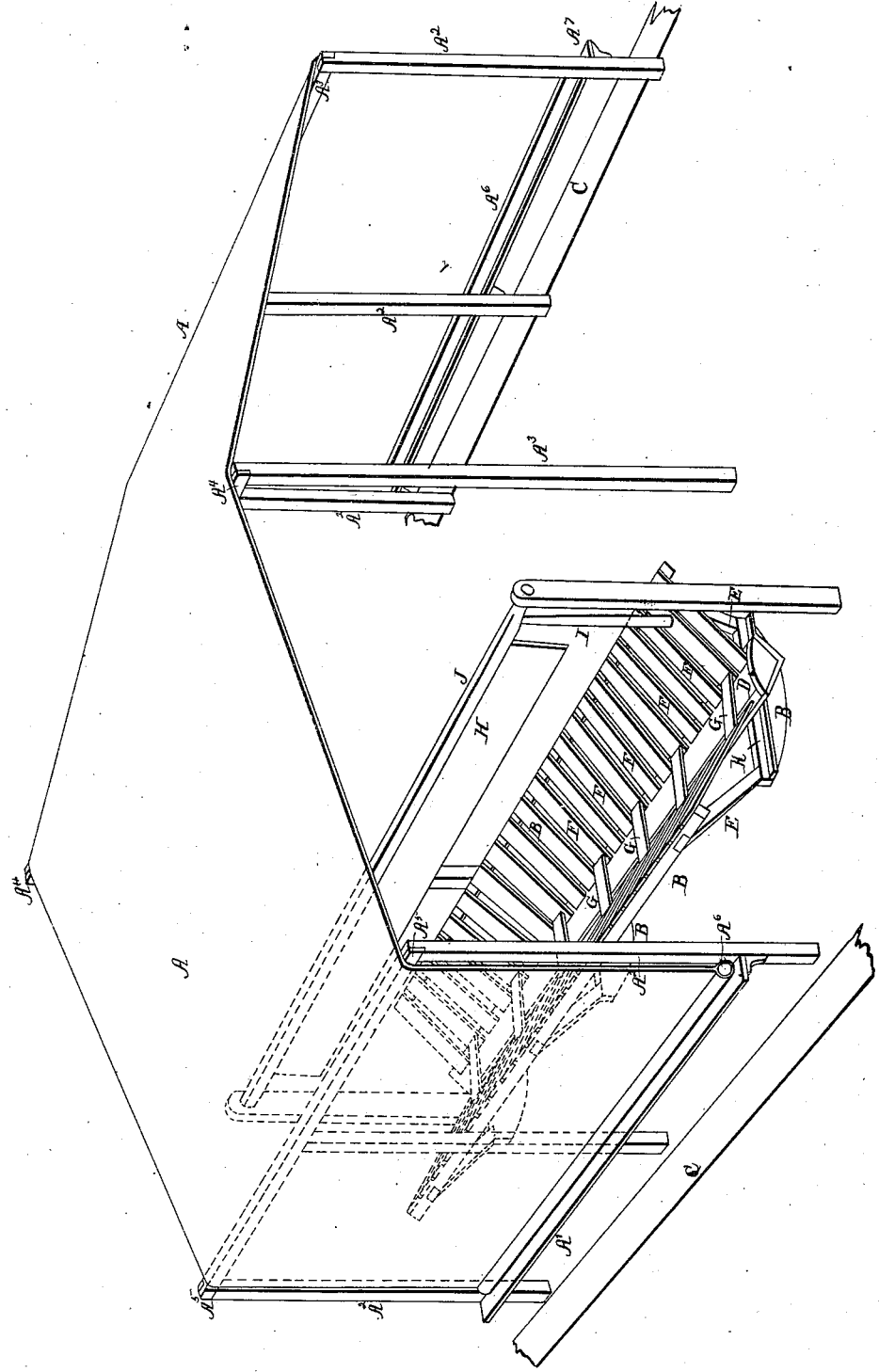

JOHN W. GILL, OF MOUNT PLEASANT, OHIO.

IMPROVEMENT IN FEEDING SILK-WORMS.

Specification forming part of Letters Patent No. 3,083, dated May 12, 1843.

*To all whom it may concern:*

Be it known that I, JOHN W. GILL, of the town of Mount Pleasant, county of Jefferson, and State of Ohio, have invented a new and Improved Mode of Feeding, Ventilating, Protecting, and Sheltering Silk-Worms, known as "Gill's Feeding-Tent and Silk-Worm Ventilating-Cradle;" and I do hereby declare that the following is a full and exact description, viz:

The tents A and cradles B may be constructed of any size and of any suitable material, keeping in view the following principles of construction: I adopt as a convenient size a tent fifteen feet wide and fifty feet long, side posts, $A^2$, four feet apart, planted in the ground, and standing above ground six feet high each side, the middle posts, $A^3$, to be eight feet apart, planted in the ground, and to stand eight and a half feet above the ground, a strong ridge ($A^4$) and eave poles ($A^5$) to be fastened along the tops of the posts from one end to the other, the tent-cloth A to be made of linen or or any other fabric, (the cloth may be painted, or otherwise, to give protection from the weather,) and to extend from the bottom on one side to continue over the top and down to the bottom on the other side, with weight-poles $A^6$ or rollers fastened at the bottom on each side, so that the covering may be rolled up to the square and let down at pleasure, to give a free circulation of air or exclude the same, to keep out rain, sunshine, &c., at pleasure. The canvas is most convenient in strips ten feet wide, with rollers same length. May use the earth for a floor. A plank, $A^7$, is to be fastened along the two outside rows of upright posts for the rollers to rest against when down. They should not reach within six inches of the ground, and a drain, c, must be made under them to carry off the water, the feeding ventilating-cradles B to be so constructed as to embrace the following principles, and of sizes to suit the breadth of tent, leaving an isle along one side and between each cradle for a tent of the above size: The cradles should have three rockers, B, four feet long, made of plank, fifteen or eighteen inches broad and one and a half inches thick, or any other convenient size, with a trough, D, resting across their centers, let in by a notch in the rockers, the trough to be made out of plank, twelve feet long and about one foot wide, with one end closed. From the points of the rockers attach upright posts E two and a half feet long, inclined out, with a cap attached to their tops on each side and parallel with the trough. To this cap and side of trough fasten lath F, one-eighth of an inch apart, the whole length of trough on each side, forming, when done, a rack about two and a half feet deep and five feet wide at top. Across the trough fasten slats G about twelve inches distance, on which to lay mulberry branches. On those branches put the worms after their second molting, or when about half grown, and feed them until they spin with branches cut about one foot long, with their leaves on. Suspended over each cradle there is to be a fan, H, made of bonnet-boards, or any other suitable material, with a pendulum, I, coming down from the shaft J. This the feeder can put in motion at pleasure, and also the cradle, thereby removing all impure air from the worms and among the branches, and shaking down the dry leaves, litter, excrements, &c., into the trough; then a bucket of water can be poured in at the upper end, and all is washed out at open end, leaving it pure and clean. No worms can fall through to the floor, but should they fall down among the branches they immediately crawl out and ascend the lath sides to the top, and when ready to spin they make their cocoons among the clean bare branches. On the rockers attached to the cradle I fix a fender, K, made of tin or any other suitable material, which prevents mice, &c., from ascending to the worms.

I claim—

The before-described cradle, for the purpose set forth.

JOHN W. GILL.

Witnesses:
    J. WATSON,
    AMOS JONES.